July 31, 1951     K. T. GRÖNDAHL     2,562,843
ELECTRICAL HEATING APPARATUS AND METHOD

Filed Nov. 19, 1947     4 Sheets-Sheet 1

INVENTOR.
Karl Teodor Gröndahl
BY
his ATTORNEY

July 31, 1951  K. T. GRÖNDAHL  2,562,843
ELECTRICAL HEATING APPARATUS AND METHOD
Filed Nov. 19, 1947  4 Sheets-Sheet 2

INVENTOR.
Karl Teodor Gröndahl
BY
his ATTORNEY

July 31, 1951     K. T. GRÖNDAHL     2,562,843
ELECTRICAL HEATING APPARATUS AND METHOD
Filed Nov. 19, 1947     4 Sheets-Sheet 3

INVENTOR.
Karl Teodor Gröndahl
BY
his ATTORNEY

July 31, 1951　　　　K. T. GRÖNDAHL　　　　2,562,843
ELECTRICAL HEATING APPARATUS AND METHOD
Filed Nov. 19, 1947　　　　　　　　　　　　　　4 Sheets-Sheet 4

Fig. 7.

INVENTOR.
Karl Teodor Gröndahl
BY
his ATTORNEY

Patented July 31, 1951

2,562,843

UNITED STATES PATENT OFFICE 2,562,843

ELECTRICAL HEATING APPARATUS AND METHOD

Karl Theodor Gröndahl, Goteborg, Sweden, assignor to Bohus Mekaniska Verkstads Aktiebolag, Goteborg, Sweden, a corporation of Sweden Application November 19, 1947, Serial No. 786,906
In Sweden November 21, 1946

30 Claims. (Cl. 219—40)

1

My invention relates to electrical heating apparatus and method, and more particularly to a method of and apparatus for producing steam electrically for heating purposes in which steam or vapor is formed or generated in a body of liquid through which a heating current passes between spaced electrodes immersed in the liquid.

Electrical heating apparatus of this type can be used for producing steam or vapor for a variety of heating purposes. By way of example and without limitation, such electrical heating apparatus may be employed for producing steam to heat cooking vessels and the receptacles of washing machines in which it is desired to heat a body of washing liquid for washing and cleaning laundry. In electrical heating apparatus of the type under consideration, the body of liquid in which the electrodes are immersed and through which the heating current passes may be referred to as a generator or place of vaporization, and the region at which the vapor or steam condenses may be referred to as a condenser which is in heat exchange relation with a heat receiving part, such as a cooking vessel, for example, to which the heat of condensation is given up.

The generator and condenser form what may be referred to as a heat transfer system of the evaporating-condensing type containing a vaporizable heat transfer agent or medium, such as water, for example. In such heat transfer systems the condensate is often returned from the condenser to the generator in a condensate return line which is separated from the path of flow of steam or vaporous heat transfer fluid flowing from the generator to the condenser.

It is an object of my invention to provide an improvement in electrical heating apparatus of this type, particularly to control the maximum power or electrical energy consumption of the generator in which the electrodes are immersed in a body of liquid.

Another object is to provide an improved heating cycle for such electrical heating apparatus in which abnormally high current peaks are avoided.

A further object is to provide an improved heating cycle for such electrical heating apparatus which is flexible in operation and can be readily adjusted and adapted for a variety of heating purposes.

A still further object is to provide an improvement in such electrical heating apparatus, particularly to control the supply of return condensate to the generator.

A still further object is to provide an improvement in such electrical heating apparatus in which one or more of the foregoing advantages are realized when the apparatus is adapted for operation at atmospheric pressure or pressures above atmospheric.

The novel features which I believe to be characteristic of my invention are set forth with particularity in the claims. The invention, both as to organization and method, together with the above and other objects and advantages thereof, will be better understood by reference to the following description taken in connection with the accompanying drawings of which:

Figure 1:
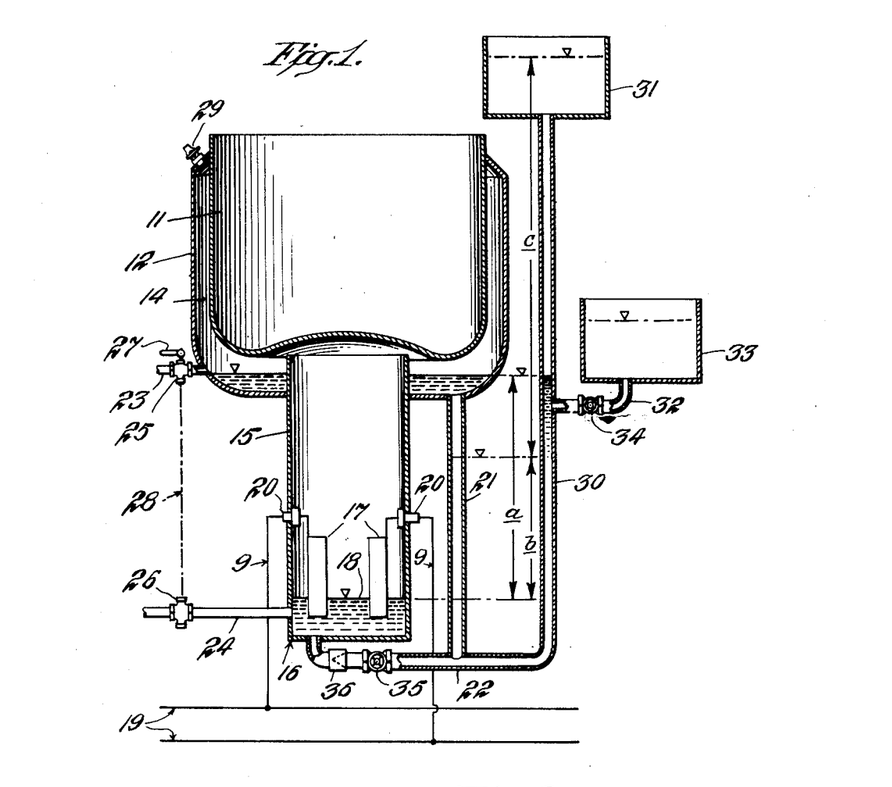
Fig. 1 is a vertical sectional view more or less diagrammatically illustrating electrical heating apparatus embodying the invention.

Referring to Fig. 1, I have shown electrical heating apparatus embodying the invention for producing steam or vapor to heat a vessel 11 which may serve as a cooking receptacle, for example. A jacket or shell 12 in spaced relation to vessel 11 and enveloping the side wall and bottom thereof forms an enclosed space 14 into which steam flows through a conduit 15 from a steam generator or vaporizer 16. The bottom of the jacket 12 is dished and bent inwardly and the upper end of the conduit 15 terminates at a region above the bottom of the jacket, so that liquid in the bottom of the jacket cannot overflow into the conduit 15. While the cross-sectional areas of the generator 16 and conduit 15 are of the same size in Fig. 1, it should be understood that the conduit 15 may be of smaller size than the generator and the latter is provided with a cover to which the lower end of the conduit is connected.

The generator 16 comprises a vessel within which a pair of electrode elements 17 are disposed for heating a body of liquid 18, such as water, by passing a heating current therethrough. The electrodes 17 are connected by conductors 9 to a source of electrical energy 19, suitable insulators 20 being provided to insulate the conductors at the regions the latter pass through the wall of the generator vessel. By passing current through the body of liquid 18 the latter becomes heated sufficiently to form steam or vapor which passes upwardly through the conduit 15 into the enclosed space 14. Such steam condenses in the space 14 and in so doing gives up heat of condensation to the vessel 11 in which cooking of food may be effected, for example.

The condensate formed in space 14 flows by gravity into the bottom part of jacket 12 to which is connected the upper end of a conduit 21, the lower end of which is connected to a conduit 22 having one end communicating with the bottom of the generator or vaporizer 16. Hence, the conduits 21 and 22 form a return condensate line through which condensate formed in the enclosed space 14 may flow back to the generator 15. A drain conduit 23 is connected to the bottom part of jacket 12 at a region below the upper end of conduit 15, and a similar drain conduit 24 is connected to the generator 16 immediately below the lower ends of the electrodes 17. Manually operable valves 25 and 26 are provided in the conduits 23 and 24, respectively, for controlling and regulating the liquid levels in the enclosed space 14 and in the generator. The valves 25 and 26 may be manually controlled independently of one another or controlled by a single operating member 27 which is associated with the valve 25 and operatively connected to the valve 26, as indicated by the dotted line 28 in Fig. 1. Further, a manually operable valve 29, which is normally closed, is provided at the upper part of jacket 12 to permit venting of steam from the enclosed space 14 when this is desired.

The conduit 22 includes an upwardly extending portion which forms a riser 30 to the upper end of which is connected an open vessel 31. To an intermediate region of the riser 30 is connected a conduit 32 communicating with a second open vessel 33, a manually operable valve 34 being provided in the conduit 32 to control flow of liquid therethrough. In the conduit 22, at a region thereof between the connection of conduit 21 and the end thereof communicating with the generator 16, are provided a manually operable valve 35 and an adjustable throttle valve 36. In a practical form of the apparatus shown in Fig. 1 and just described, the vessels 31 and 33 can be mounted on suitable supporting structure fixed to the jacket 12 or other parts of the apparatus.

To place the apparatus of Fig. 1 in operation, a liquid, such as water, is admitted into the generator 16 to moisten and wet the electrodes 17. This may be accomplished, for example, by closing valves 34 and 35, and supplying water at the vessel 31. When water discharges through drain conduit 24, the supply of water can be terminated and manually operable valve 26 then closed. The valve 26 is provided to control the liquid level in the generator 16, and, after liquid has been withdrawn from the generator through the conduit 24, the valve 26 is then closed and the electrodes 17 connected to the source of electrical energy 19, as by closing a switch (not shown) which may be connected in one of the conductors 9. After the electrical circuit for the electrodes 17 is completed, the liquid level in the bottom part of the jacket 12 is controlled and regulated by the manually operable valve 25.

The manually operable valve 35 is then opened to permit liquid to flow through conduit 22 past the throttle valve 36 into the bottom of the generator 16. At first the liquid level in the generator 16 rises very gradually, and such rise in liquid level causes a lowering of the liquid levels in jacket 12 and the riser 30 which is relatively small and insignificant. As the wetted surface area of the electrodes 17 increases due to rise in liquid level in the generator 16, the magnitude of the current passing through the liquid body 18 in which the electrodes are immersed also increases, thus increasing the heating of the liquid and the rate at which steam or vapor is produced in the generator 16. An equilibrium condition is then attained at which time the liquid in the different parts of the apparatus may reach the levels indicated in Fig. 1, for example.

The condensate formed in the enclosed space 14 flows to the bottom of the jacket 12 and returns to the generator vessel 16 through the conduits 21 and 22, as previously explained, the height of the liquid column $a$ in Fig. 1, which is the difference between the liquid levels in generator 16 and the return condensate line, remaining substantially constant. During the heating period being described, heat of condensation resulting from condensation of steam or vapor is given up to the vessel 11, which may be referred to as a heat receiving part, and the steam or vapor is continuously formed in the generator 16 due to the heating current passing through the liquid body 18.

When the contents of vessel 11 approaches the boiling temperature of the liquid, the rate at which steam or vapor condenses in the enclosed space 14 decreases and the vapor pressure increases in the latter and in the generator 16. This is so because the generator 16, conduit 15, enclosed space 14 and return condensate line formed by the conduits 21 and 22 essentially form a heat transfer system of the evaporating-condensing type in which vapor is formed at the place of heating 16 and such vapor condenses in the enclosed space 12 at which region heat is given up to the vessel or heat receiving part 11. Therefore, when the temperature of the heat receiving part 11 approaches the temperature of the vaporous heat transfer fluid and the rate of condensation of the vaporous fluid decreases, the vapor pressure builds up in the heat transfer system and the liquid surface level in the return condensate line may fall in the conduit 21 until the difference in liquid levels in conduit 21 and in the generator 16 is represented by the column $b$ in Fig. 1, for example.

The liquid forced down in conduit 21 passes into the riser conduit 30 and open vessel 31 and may reach the dotted line position in the latter, as shown in Fig. 1. In such case the vapor pressure in the enclosed space 14 and generator 16 is equivalent to the height of the liquid column $c$ in Fig. 1 which is the difference in liquid levels in conduit 21 and in the open vessel 31. In the event the vapor pressure in the generator 16 and enclosed space 14 increases further, the liquid surface level in conduit 21 is depressed further and the height of the liquid column $c$ in Fig. 1 becomes greater. In such event the pressure differential across the throttle valve 36 becomes even smaller and reduces the rate at which liquid is returned through conduit 22 to the generator 16. When the rate of supply of liquid is reduced, the wetted electrode surface area becomes smaller which in turn reduces the magnitude of current passing through the liquid body 18 and the rate at which steam or vapor is formed or generated in the generator 16. Since the only factors affecting the liquid surface level in the generator 16 are the rate at which liquid is supplied thereto past the throttle valve 36 and the rate at which the liquid is vaporized and converted into steam or vapor, and these factors more or less offset and balance each other, no disturbing swells or changes in liquid level take place in generator 16.

Figure 2:
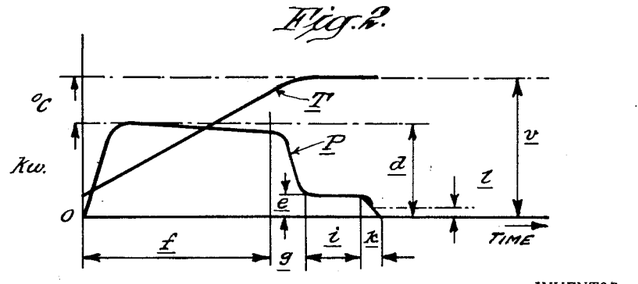
Fig. 2 is an explanatory diagram to illustrate the operation of the apparatus shown in Fig. 1.

In order to understand more fully the characteristic features of operation of the heating apparatus of Fig. 1, reference is made to the explanatory diagram of Fig. 2 illustrating two curves in which the electrical energy or power consumption in kilowatts (kw.) and temperature at the place of heating in °C. (ordinates) are plotted against time (abscissa). After the manually operable valve 35 is opened at the beginning of the heating period, which is designated O in Fig. 2, the power or electrical energy consumption P rises relatively rapidly to a maximum value $d$. During the heating period, which is designated by the time interval $f$, the electrical energy or power consumption P falls very slightly and only to an insignificant extent below the maximum value $d$.

After heating of the contents of the vessel 11 is started by commencing such heating period $f$, its temperature T increases at a more or less steady rate and finally reaches the boiling temperature $v$. Just before the contents of vessel 11 reaches the boiling temperature $v$, the electrical energy consumption P automatically drops very rapidly to a reduced value $e$ during a period or interval of time designated $g$. The power consumption P remains substantially constant at the reduced value $e$ while boiling of the contents of the vessel 11 is continued, and, after a desired interval of time designated $i$, the supply of liquid to the generator 16 is stopped by closing manually operable valve 35. Vaporization of liquid in the generator 16 then continues during an interval of time designated $k$ until the liquid surface level falls below the lower ends of the electrodes 17 so that heating current can no longer pass through the liquid body 18, whereupon the supply of electrical energy to the electrodes is interrupted. The power or electrical energy consumption curve P, represented by the solid line in Fig. 2, more or less illustrates the operation of the apparatus of Fig. 1 when valve 34 is closed.

The vessels 31 and 33 may be referred to as expansion vessels due to their relatively large cross-sectional areas compared to that of riser 30. The height or elevation of the vessel 31 with respect to the heating vessel 11 and enclosed space 14 enveloping the latter determines the maximum vapor pressure as well as the maximum vapor or steam temperature in the heat transfer system, that is, in the generator 16 and conduit 15 and enclosed space 14. Hence, the elevation of the expansion vessel 31 determines the period or interval of time during which boiling of the contents of vessel 11 takes place.

If it is desired to extend the interval of time during which boiling of the contents of vessel 11 takes place, the manually operable valve 34 may be opened whereupon liquid is withdrawn from the higher located expansion vessel 31 into the lower expansion vessel 33. This reduces the height of the liquid column $c$ which determines the vapor or steam pressure in the enclosed space 14 of the heat transfer system. When this is done a comparatively smooth additional boiling of the contents of vessel 11 is accomplished at a reduced steam or vapor pressure in the heat transfer system; and, with such operation of the apparatus of Fig. 1, the power or electrical energy consumption can be limited to a value $l$, as indicated by the dotted line which extends from the right hand portion of the power consumption curve in solid line in Fig. 2.

An important feature of the apparatus of Fig. 1 is that, when a heating period is started by opening valve 35, liquid is supplied to the generator 16 through the conduit 22 at a relatively constant rate per unit interval of time for a definite difference in liquid levels between the liquid level in the generator 16 and in the return condensate line of which conduit 21 and jacket 12 form a part. This difference in liquid levels can be adjusted and controlled by the manually operable valves 25 and 26, the former being effective to determine the liquid level in the bottom of the jacket 12 and the latter to determine the liquid level in the generator 16. In this manner the difference in liquid levels between the liquid level in generator 16 and the return condensate line can be adjusted to a value which will determine the depth to which the electrodes 17 are immersed in the liquid body 18 and hence the maximum power or electrical energy consumption of the generator 16. Further, the throttle valve 36 in the conduit 22 is adjusted so that liquid will be supplied to the generator 16, and steam or vapor will be formed therein, at such a rate per unit length of time as to maintain the desired maximum power or electrical energy consumption at which the generator is intended to be operated during the heating period described above.

In order to minimize the return of condensate through the conduit 15 to the generator 16, the bottom of the vessel 11 is dished inwardly, as seen in Fig. 1, whereby any condensate formed at the dished bottom tends to pass toward the side wall of the vessel and drip into the bottom of the jacket 12 rather than into the conduit 15. In this way as much of the condensate as possible is supplied in a regulated manner to the generator 16 through the return condensate line including the conduit 22.

As explained above, the pressure differential across the throttle valve 36, and hence the rate at which liquid is supplied to the generator 16 per unit interval of time, becomes smaller when the vapor or steam pressure builds up in the heat transfer system and depresses the liquid surface level in the conduit 21. However, this will not produce any disturbing swells or changes in liquid level in the generator 16 for the reason previously given, so that steep and abnormally high heating current peaks are avoided; and the maximum power or electrical energy consumption will be maintained in the manner explained above in connection with the explanatory diagram of Fig. 2 even though in certain instances the need for consuming electrical energy at an even greater or higher rate in the generator 16 may exist.

Figure 3:
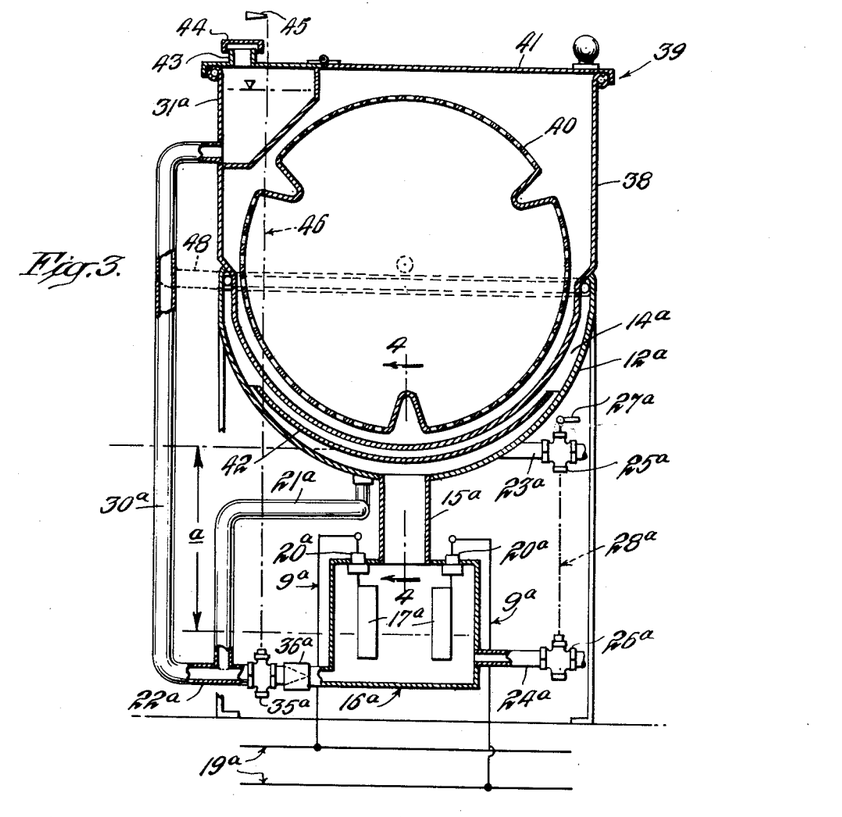
Fig. 3 is a vertical sectional view of electrical heating apparatus diagrammatically illustrating another embodiment of the invention.
Figure 4:
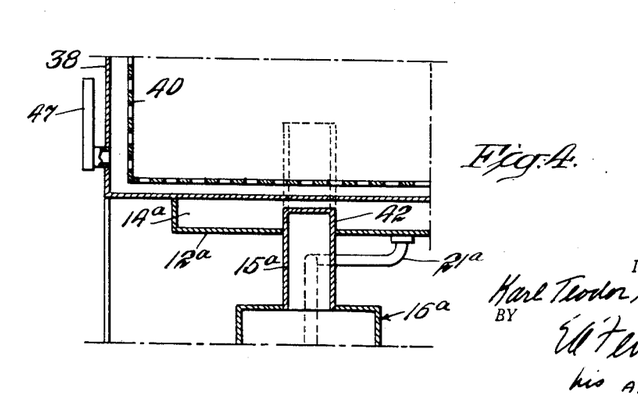
Fig. 4 is an enlarged fragmentary view taken at line 4—4 of Fig. 3 to illustrate details more clearly.

In Figs. 3 and 4 I have shown another embodiment of the invention in which parts similar to or having the same function as those illustrated in Fig. 1 are referred to by the same reference numerals with a suffix $a$ added thereto. In the embodiment of Figs. 3 and 4 heating apparatus generally like that shown in Fig. 1 is provided for producing steam or vapor to heat a receptacle or vat 38 of a washing machine 39 within which a perforated drum 40 is rotatably supported in any suitable manner (not shown).

The drum 40 is provided with a suitable cover (not shown) through which laundry to be washed is adapted to be inserted. The drum 40 is adapted to rotate in a body of washing liquid held in the receptacle 38, the washing liquid being introduced into the receptacle in any suitable manner through an opening at the top of the washing machine adapted to be closed by a hinged cover 41.

The bottom half of the washing receptacle 38 is semi-circular in cross-section and the jacket 12a is disposed about such bottom half to provide the enclosed space 14a. The embodiment of Figs. 3 and 4 differs from that of Fig. 1 in that a conduit 42 is provided intermediate the ends of the jacket 12a, such conduit 42 being transverse to the axis of the drum 40 and extending upwardly from the bottom of the enclosed space 14a at both sides of the jacket 12a. The conduit 42 is more or less crescent-shaped and is connected at its lowermost part to the upper end of conduit 15a.

The steam or vapor flowing from the generator 16a through conduit 15a is divided into two streams by the conduit or pipe 42 which may be referred to as a distributor pipe for distributing steam at both sides of the enclosed space 14a. The distributor pipe 42 extends upwardly a sufficient distance at both sides of the washing receptacle 38a so that condensate formed in the enclosed space 14a cannot flow downwardly within the distributor pipe and return to the generator 16a through the conduit 15a.

The expansion vessel 31a correesponding to the expansion vessel 31 in Fig. 1 is located within the washing machine 39 at the upper part thereof. No expansion vessel is shown in Fig. 3 which corresponds to the expansion vessel 33 in Fig. 1. The expansion vessel 31a is provided with an upright inlet pipe 43 which projects through an opening at the top of the washing machine. A suitable protective cover 44 overlies the pipe 43 and is arranged in spaced relation therewith in any suitable manner so that the expansion vessel 31a will always be in open communication with the atmosphere. In order to facilitate control of the manually operable valve 35a, the latter may be operatively connected to a control lever 45 at the top of the washing machine in any suitable manner, as indicated by the dotted line 46 in Fig. 3. As shown in Fig. 4, a thermostat 47 may be provided at the exterior of the washing receptacle 38 which is responsive to the temperature of the washing liquid in the receptacle.

The embodiment of Figs. 3 and 4 as thus far described may be operated in the same manner as the embodiment of Fig. 1 when the valve 34 in the latter is closed and the expansion vessel 33 is rendered inoperative. However, for many heating purposes it is not necessary to heat the contents of a heat consuming device to the boiling temperature and this is particularly true in washing machines in which the washing liquids are desirably heated to temperatures of 85° to 90° C. or lower so that damage to laundry will be avoided.

Even when it is not necessary to bring the contents of a heat receiving part to its boiling temperature, the maximum power or electrical energy consumption does not drop appreciably. This will be apparent from the explanatory diagram in Fig. 2 in which the maximum electrical energy consumption or load P is reached relatively rapidly after the heating period $f$ is started and while the temperature T is considerably below its maximum value $v$. Consequently, the vapor pressure in the condenser or enclosed space is more or less at atmospheric and all of the steam condenses in the condenser. Hence, for certain heating purposes the need for increasing the steam or vapor pressure above atmospheric in the heat transfer system to reach definite heating temperatures does not arise.

In order to avoid overheating of a heat consuming device in certain instances, as in a washing machine, for example, the generator or vaporizer desirably may be rendered inoperative during the washing of laundry by closing the valve 35a and stopping the supply of return condensate to the generator 16a before the washing liquid reaches its boiling point. Such regulation of the heat supply to the washing receptacle can be nicely avoided, however, by modifying the embodiment of Figs. 3 and 4 to eliminate the riser 30a and operating the heat transfer system at atmospheric pressure. To this end a pipe or conduit 48 may be employed which is arranged at one end of the washing machine 39 and in communication with the extreme upper part of the condenser or enclosed space 14a at opposite sides thereof, as shown in Fig. 3. The conduit 48 may be connected to the upper part of the riser conduit 30a, and the lower part of such riser conduit extending downwardly to the conduit 22a may be eliminated. In such proposed modification return condensate flowing through conduit 21a would only pass through conduit 22a to the generator 16a.

Figure 5:
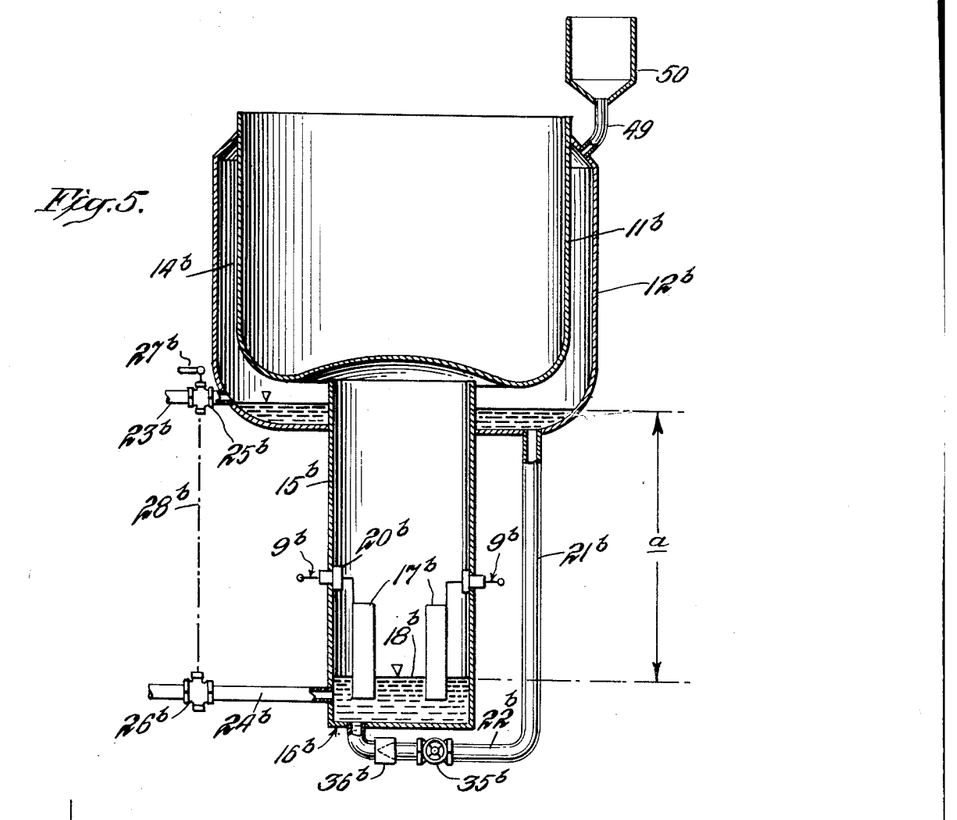
Fig. 5 is a vertical sectional view of electrical heating apparatus diagrammatically illustrating a further embodiment of the invention.

The modified arrangement for Figs. 3 and 4 which has just been described is illustrated more clearly in Fig. 5 in which parts similar to and having the same function as those shown in Figs. 1 and 3 are referred to by the same reference numerals with a suffix $b$ added thereto. In the embodiment of Fig. 5 the enclosed space 14b is in open communication with the atmosphere through a conduit 49 to which is connected an open receptacle 50 to facilitate filling the heat transfer system with liquid, such as water. In Fig. 5 the generator 16b always operates with maximum power or electrical energy consumption, such operation being dependent upon the difference in liquid levels in the generator 16b and in the return condensate line which is indicated by the column $a$.

Figure 6:
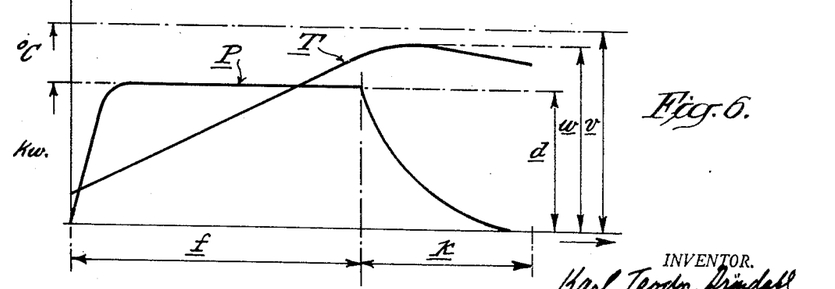
Fig. 6 is an explanatory diagram to illustrate the operation of the apparatus shown in Fig. 5.

In the explanatory diagram of Fig. 6 which is generally like that shown in Fig. 2, the power or electrical energy consumption P and temperature T are plotted against time. During the heating period which is designated by the interval of time $f$, the power P rises very rapidly at the beginning to its maximum value $d$ and thereafter remains at such maximum value during the entire heating period. When valve 35b is closed, vaporization of liquid in the generator 16b then continues during an interval of time designated $k$ until the electrodes 17b are no longer wetted by liquid and the heating current passing through the liquid body 18b is interrupted. The interval of time designated $k$ may be referred to as the "boiling off" period during which the electrical energy consumption gradually decreases and finally becomes zero.

In the event valve 35b is not closed to render the generator 16b inoperative when a temperature in the neighborhood of 85° to 90° C. is reached, all of the steam or vapor flowing into the enclosed space 14b will not condense therein and a portion thereof will pass through the conduit 49 and receptacle 50 and vent into the atmosphere. Hence, the embodiment of Fig. 5 differs from that in Fig. 1 in which the pressure in the heat transfer system builds up and depresses the liquid column in the conduit 21 when the temperature of the heat consuming device 11 reaches such a value that all of the steam does not condense in the enclosed chamber 14. Therefore in the embodiment of Fig. 5 no automatic reduction in power consumption in the generator 16b occurs as in the embodiment of Fig. 1, as explained above in connection with the explanatory diagram of Fig. 2 in which such automatic reduction in power consumption of the generator occurs in the interval of time designated $g$.

In the explanatory diagram of Fig. 6 it will be observed that the maximum temperature $T$ that the washing liquid reaches in receptacle 11b is designated $w$ which is less than the value $v$ referred to in connection with the explanatory diagram of Fig. 2, it being understood that the value $v$ in Fig. 6 designates the boiling temperature of the washing liquid in the vessel 11b. The primary difference between the operation of the embodiment of Fig. 5 and that of the washing machine of Fig. 3, when the riser conduit 30a is utilized in the latter, is that in the embodiment of Fig. 5 some liquid is lost by the venting of steam into the atmosphere. This is especially true when the valve 35b is not closed to render the generator 16b inoperative when the heat receiving part reaches the desired elevated temperature which is below its boiling point.

Figure 7:
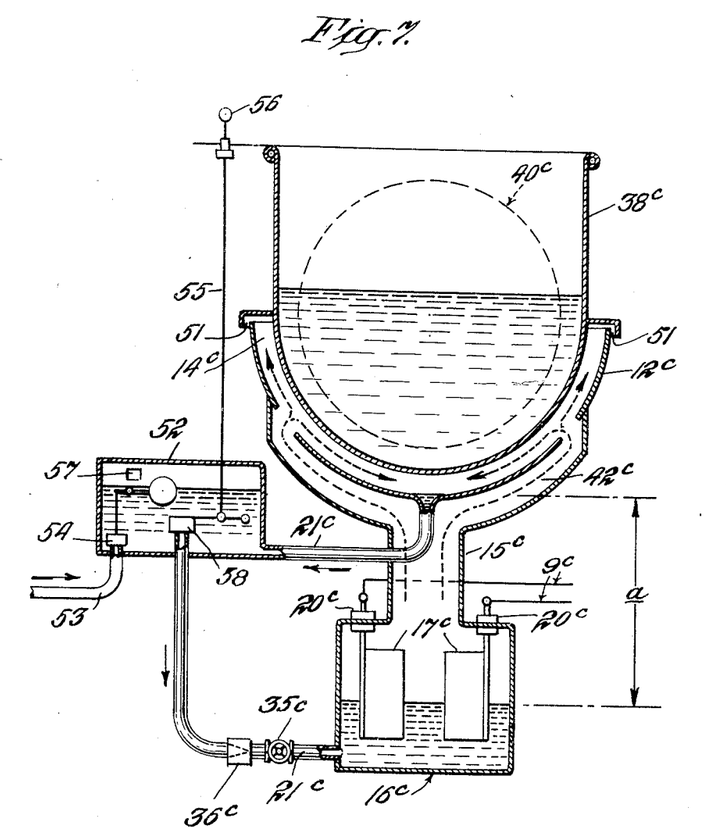
Fig. 7 is a view similar to Figs. 3 and 5 of electrical heating apparatus diagrammatically illustrating a still further embodiment of the invention.

It sometimes happens that an operator forgets to introduce liquid into the heat transfer system. In Fig. 7 I have shown an embodiment of the invention in which liquid, such as water, is automatically supplied to the heat transfer system. The embodiment of Fig. 7 illustrates another application for utilizing the steam or vapor to heat washing liquid in a washing machine and in which parts similar to and having the same function as those illustrated in the previous embodiments are referred to by the same reference numerals with a suffix c added thereto. A drum 40c indicated by a dotted line is arranged to be rotatably supported in a washing receptacle 38c having a jacket 12c disposed about the bottom part thereof. A distributor pipe 42c is provided for distributing steam or vapor in the same manner shown in Figs. 3 and 4 and previously described.

The embodiment of Fig. 7 is adapted to operate at atmospheric pressure and is provided with a number of openings 51 about the periphery of the extreme upper part of the jacket 12c to permit steam to vent from the enclosed space 14c into atmosphere. A vessel 52 is connected in the return condensate line 21c into which water is delivered through a conduit 53 from a suitable source of supply. The conduit 53 extends upwardly into the vessel 52 and the upper open end thereof is arranged to be opened and closed by a float operated valve 54 to maintain the liquid level at a definite height in the vessel.

Since the upper part of the return condensate line 21c is in open communication with the vessel 52 and the bottom part of the enclosed space 14c, the liquid level in the enclosed space 14c will be the same as that in the vessel. The bottom part of the return condensate line 21c extends upwardly into the vessel 52, the upper end of which is arranged to be opened and closed by the valve 58 which is operatively connected by linkage 55 to a control member 56 provided at the top of the washing machine in the same manner as the control lever 45 in Fig. 3. A suitable vent opening 57 is provided in the vessel 52 above the liquid level maintained therein by the float operated valve 54.

In Fig. 7 operation of the generator 16c is started by opening valve 35c so that liquid will flow through the lower part of conduit 21c in which is connected the throttle valve 36c. The operation of the embodiment of Fig. 7 is similar to that of Fig. 5 in that the generator 16c will always operate with maximum power or electrical energy consumption which is dependent upon the difference in liquid levels in the generator 16c and in the condensate return line, as indicated by the column $a$. Hence, the description of the operation of the Fig. 5 embodiment and the explanatory diagram of Fig. 6 are also applicable to the embodiment of Fig. 7. When the liquid level in vessel 52 falls sufficiently due to venting of steam through the openings 51 into atmosphere, the float operated valve 54 automatically acts to admit sufficient make-up liquid whereby the heat transfer system will always contain the proper amount of liquid therein to maintain the liquid column $a$ substantially constant. Further, by supplying liquid automatically to the heat transfer system in the manner just described, the generator 16c will always contain the proper quantity of liquid when a heating period is instigated by connecting the electrodes 17c to a source of electrical energy and opening valve 35c.

Although I have shown and described several embodiments of my invention, it will be apparent to those skilled in the art that modifications and changes may be made without departing from the spirit and scope of the invention, as pointed out in the following claims.

What is claimed is:

1. A method of producing steam to effect useful heating which comprises passing a heating current through a body of liquid at a place of vaporization to effect vaporization of such liquid, flowing vapor from the place of vaporization in a first path of flow to a place of condensation at which heat is given up to a heat receiving part in heat exchange relation therewith, and flowing liquid condensate formed at the place of condensation by gravity to a flow impeding region in a second path of flow and from which region such liquid can flow without interruption to the place of vaporization and form a liquid column in the second path of flow subject substantially to the same vapor pressure as the body of liquid and having a liquid surface level above that of the body of liquid to effect uninterrupted flow of liquid to the place of vaporization at a rate which is dependent solely upon the difference in surface levels of the liquid column and the body of liquid, thereby controlling the quantity of liquid in the liquid body and hence the amount of such liquid subject to the influence of the heating current.

2. A method of producing steam to effect useful heating which comprises passing a heating current between electrodes partially immersed in a body of liquid at a place of vaporization to effect vaporization of such liquid, flowing vapor from the place of vaporization in a first path of flow to a place of condensation at which heat of condensation is given up to a heat receiving part in heat exchange relation therewith, and flowing liquid condensate formed at the place of condensation by gravity to a region in a second path of flow in which flow of such liquid always is only partially impeded and from such region to the place of vaporization without producing any disturbing swells or sudden changes in the surface level of the liquid body.

3. A method of producing steam to effect useful heating which comprises passing a heating current between electrodes immersed in a body of liquid at a place of vaporization to effect vaporization of such liquid, flowing vapor in a first path of flow to a place of condensation always in unobstructed vapor communication with the place of vaporization and at which heat of condensation is given up to a heat receiving part in heat exchange relation therewith, and flowing liquid condensate formed at the place of condensation by gravity to a region in a second path of flow in which flow of such liquid always is only partially blocked and from such region to the place of vaporization without producing any disturbing swells in the body of liquid, such blocking forming a liquid column in the second path of flow having a surface-level above that of the body of liquid.

4. A method of producing steam to effect useful heating which comprises passing a heating current between electrodes immersed in a body of liquid at a place of vaporization to effect vaporization of such liquid, flowing vapor from the place of vaporization in a first path of flow to a place of condensation in open communication with the atmosphere and at which heat of condensation is given up to a heat receiving part in heat exchange relation therewith, and flowing liquid condensate formed at the place of condensation to a region in a second path of flow in which flow of such liquid always is only partially blocked and from such region to the place of vaporization and thereby form a liquid column in the second path of flow having a surface level above that of the body of liquid so as to maintain the surface level of body of liquid substantially constant when practically all of the vapor is condensed at the place of condensation.

5. An electrical heating system including a generator having spaced-apart electrodes adapted to be connected to a source of electrical energy for passing a heating current through a body of liquid to produce steam or vapor, a condenser connected to receive vapor from said generator, said condenser being adapted to be in heat exchange relation with a heat receiving part of a device to be heated, conduit means associated with said condenser and forming therewith a line for returning liquid condensate from said condenser to said generator, the liquid in said condensate return line being subject substantially to the same vapor pressure as the liquid body in said generator, and means associated with said condensate return line for always only partially impeding flow of liquid therethrough to said generator during operation of the system and thereby maintain the liquid surface level in said return line above that of the liquid body in said generator, such difference in liquid surface levels in said generator and return condensate line being the principal controlling factor for determining the rate at which steam or vapor is produced per unit interval of time at the prevailing pressure in the system, the voltage of the source of electrical energy and electrical conductivity of the body of liquid.

6. An electrical heating system as set forth in claim 5 in which said flow impeding means is always only partially effective to impede flow of liquid through said condensate return line to avoid disturbing swells or sudden changes in the surface level of the liquid body.

7. An electrical heating system as set forth in claim 5 in which said condensate return line always provides open communication between said condenser and generator during normal operation of the system and hence a condensate return line which is never completely closed while said condenser receives vapor from said generator.

8. An electrical heating system as set forth in claim 5 in which only a single conduit is in open communication with said generator below the liquid surface level therein during operation of the system, said single conduit comprising said condensate return line.

9. An electrical heating system as set forth in claim 5 in which said condenser is unobstructedly connected to said generator to receive vapor therefrom.

10. An electrical heating system as set forth in claim 5 in which said condenser is in open communication with the atmosphere.

11. An electrical heating system as set forth in claim 10 in which said flow impeding means is effective to allow liquid to return to said generator through said condensate return line at such a rate that the surface level of the liquid body will be maintained substantially constant at a region between the upper and lower ends of the electrodes when substantially all of the vapor received by said condenser is condensed therein during operation of the system.

12. An electrical heating system as set forth in claim 5 in which said flow impeding means is effective to allow liquid to enter said generator at a smaller rate of flow per unit interval of time than that which can be evaporated at the same unit interval of time when the electrodes in their entirety are immersed in the liquid body and the pressure in the system, the voltage of the source of electrical energy and the conductivity of the liquid remain substantially the same as for said smaller rate of flow.

13. An electrical heating system as set forth in claim 5 in which said flow impeding means comprises a throttling member.

14. An electrical heating system as set forth in claim 5 including a riser extending upwardly from said condensate return line at a region thereof between said condenser and flow impeding means, and a vessel connected to said riser which is in open communication with the atmosphere.

15. An electrical heating system as set forth in claim 14 including valve means for rendering said riser and vessel associated therewith inoperable.

16. An electrical heating system as set forth in claim 5 including a riser extending upwardly from said condensate return line at a region thereof between said condenser and flow impeding means, and a vessel connected to said riser which is in open communication with the atmosphere, said condensate return line and riser together forming a liquid trap between the upper part of said condenser and vessel having two branches for liquid columns capable of having the same surface levels.

17. An electrical heating system as set forth in claim 5 including a riser extending upwardly from said condensate return line at a region thereof between said condenser and flow impeding means, and a vessel connected to said riser which is in open communication with the atmosphere, said condensate return line and riser together forming a liquid trap between the upper part of said condenser and vessel having two branches for liquid columns capable of having their surface levels take different vertical positions responsive to the vapor pressure in the system.

18. An electrical heating system as set forth in claim 17 in which the lowest part of the liquid trap is at a lower elevation than the surface level of the liquid body adapted to be held in said generator and at or lower than the lower ends of said electrodes, said condenser having an opening in the upper part thereof and a closure member therefor, such opening normally being closed by said closure member during operation of the system and, when the closure member is rendered ineffective when the operation of the system is terminated, being capable of establishing communication between the interior of said condenser and the atmosphere.

19. An electrical heating system as set forth in claim 5 including a riser extending upwardly from said condensate return line at a region thereof between said condenser and flow impeding means, two vessels at different elevations each connected to said riser, each of said vessels having a cross-sectional area greater than that of said riser, and valve means to prevent flow of liquid from said riser to said vessel at a lower elevation.

20. An electrical heating system including a vapor generator having spaced-apart electrodes adapted to be partially immersed in a body of liquid for passing a heating current therethrough to produce vapor when energized from a source of electrical supply in a definite voltage range, a condenser adapted to serve as a heating element, vertically extending conduit means connecting said condenser and the vapor space of said generator above the liquid surface level therein, vertically extending conduit means associated with said condenser and forming therewith a line for returning condensate by gravity from said condenser to said generator, and flow impeding means associated with said condensate return line for always only partially impeding flow of liquid therethrough during operation of the system, such flow impeding means being capable of maintaining a liquid column in said return line having a surface level at a higher elevation than the surface level of the liquid body in said generator and operable to enable liquid to flow to said generator through said condensate return line at such a rate that said electrodes will never be completely immersed in the body of liquid when operated in said definite voltage range.

21. An electrical heating system including a vapor generator having spaced-apart electrodes adapted to be partially immersed in a body of liquid for passing a heating current therethrough when energized from a source of electrical energy at a definite voltage, a condenser at a higher elevation than said generator which is adapted to serve as a heating element, vertically extending conduit means connecting said condenser and the vapor space of said generator above the liquid level therein, vertically extending conduit means associated with said condenser and forming therewith a line for returning condensate by gravity from said condenser to said generator, and flow impeding means associated with said condensate return line for always only partially impeding flow of liquid therethrough during operation of the system, such flow impeding means being capable of maintaining a liquid column in said return line having a surface level at a higher elevation than the surface level of the liquid body in said generator and, when equilibrium conditions are attained during operation of the system, operable to enable liquid to flow to said generator through said return line at a rate which is responsive solely to the difference in the liquid surface levels in said return line and generator and will never exceed a value to cause the liquid surface level in said generator to rise above a predetermined height when said electrodes are energized substantially at said definite voltage.

22. An electrical heating system including a vapor generator comprising a vessel for holding a body of liquid and a pair of spaced-apart electrodes adapted to be partially immersed in such liquid during normal operation of the system for passing a heating current therethrough to produce vapor when connected to a source of electrical energy, a condenser adapted to serve as a heating element, first conduit means connecting said condenser and the vapor space of said generator above the liquid level therein, second conduit means associated with said condenser and forming therewith a line for returning condensate from said condenser to said generator, and blocking means associated with said condensate return line for always only partially blocking flow of liquid therethrough during normal operation of the system, said blocking means being capable of maintaining a liquid column in said return line having a surface level at a higher elevation than the surface level of the liquid body in said generator and operable to enable liquid to flow to said generator through said return line at a rate responsive solely to the difference in the liquid surface levels in said return line and generator.

23. An electrical heating system as set forth in claim 22 including conduit means for supplying liquid to the system from a source of supply, and means for controlling the supply of such liquid responsive to an operating condition of the system.

24. An electrical heating system as set forth in claim 22 including means for supplying liquid to the system from a source of supply, and means responsive to change in liquid level in a part of the system for controlling the supply of such liquid.

25. An electrical heating system as set forth in claim 22 including means communicating with said return condensate line for supplying liquid to the system from a source of supply, and means for controlling the supply of such liquid responsive to an operating condition of the system.

26. An electrical heating system as set forth in claim 22 including conduit means communicating with said return condensate line at a region thereof between said condenser and said blocking means for supplying liquid to the system from a source of supply, and means for controlling the supply of such liquid responsive to change in a surface level of the liquid column in said return line.

27. An electrical heating system as set forth in claim 26 including means associated with said condensate return line operable to shut off and allow flow of liquid therethrough to said generator.

28. An electrical heating system as set forth in claim 27 in which said condensate return line includes a vessel having the upper part thereof vented to the atmosphere and to which the liquid supply means is connected for supplying liquid to the system, and said means for shutting off and allowing flow of liquid to said generator is disposed within said vessel and operable from the exterior thereof.

29. An electrical heating system as set forth in claim 22 in which said condenser includes provisions for venting vapor therefrom to the atmosphere, means for supplying liquid to the system from a source of supply, and means for controlling the supply of such liquid responsive to change in liquid level in a part of the system.

30. An electrical heating system as set forth in claim 22 in which said condenser is permanently vented to atmosphere, and means responsive to loss of liquid in the system due to vapor passing from the vent for adding make-up liquid to the system.

KARL THEODOR GRÖNDAHL.

REFERENCES CITED

The following references are of record in the file of this patent:

UNITED STATES PATENTS

| Number | Name | Date |
| --- | --- | --- |
| 1,450,833 | Bergeon | Apr. 3, 1923 |
| 1,504,928 | Bergeon | Aug. 12, 1924 |
| 1,522,474 | Horstkotte | Jan. 6, 1925 |
| 1,665,793 | Sandborgh | Apr. 10, 1928 |
| 1,862,071 | Vickery | June 7, 1932 |
| 1,941,020 | Poindexter | Dec. 26, 1933 |
| 2,081,537 | Hanks | May 25, 1937 |